United States Patent [19]

Hoover

[11] 4,048,365
[45] Sept. 13, 1977

[54] ARMOR STRUCTURE FORMED FROM PLASTIC LAMINATES

[76] Inventor: William H. Hoover, P.O. Box 2601, San Rafael, Calif. 94902

[21] Appl. No.: 610,947

[22] Filed: Sept. 8, 1975

Related U.S. Application Data

[63] Continuation of Ser. No. 473,246, May 24, 1974, abandoned.

[51] Int. Cl.² .................. B32B 7/02; B32B 17/10; F41H 5/04; F41H 5/06
[52] U.S. Cl. ........................... 428/215; 89/36 A; 89/36 R; 244/121; 428/218; 428/273; 428/302; 428/290; 428/430; 428/431; 428/480; 428/482; 428/474; 428/911
[58] Field of Search ............ 428/911, 430, 431, 474, 428/480, 218, 482, 302, 215, 273, 290; 2/2.5; 89/36 A, 36 R; 244/121

[56] References Cited

U.S. PATENT DOCUMENTS

| | | | |
|---|---|---|---|
| 1,777,309 | 10/1930 | Hopkinson | 428/911 |
| 2,409,645 | 10/1946 | Sawyer | 428/911 |
| 2,562,951 | 8/1951 | Rose | 89/36 A |
| 2,697,054 | 12/1954 | Dietz | 428/911 |
| 2,778,761 | 1/1957 | Frieder | 428/911 |

FOREIGN PATENT DOCUMENTS

| | | | |
|---|---|---|---|
| 937,172 | 9/1963 | United Kingdom | 428/911 |
| 1,043,990 | 9/1966 | United Kingdom | 428/911 |

Primary Examiner—Ellis Robinson
Attorney, Agent, or Firm—John L. Mc Gannon

[57] ABSTRACT

Improved armor structure comprised of an assembly of stacked, plastic plates of a first density and a layer of plastic material of a second density different from the first density between each pair of adjacent plates, respectively. Each plate is comprised of a number of layers of reinforcing material, such as fiber glass material, embedded in a resin to form a monolithic construction. Each layer is comprised of a mat of suitable material, such as fiber glass, impregnated with a binder, such as polyester resin. The layer has a finite thickness generally less than the thickness of each plate. The outer plates of the stack have exposed outer surfaces free of additional structure. The difference in densities of the plates and the layers causes delamination at one or more of the interfaces therebetween when the shock wave of a projectile entering the assembly partially propagates through and is partially reflected by such interfaces so as to dissipate the energy of the projectile itself.

5 Claims, 3 Drawing Figures

ARMOR STRUCTURE FORMED FROM PLASTIC LAMINATES

This is a continuation of application Ser. No. 473,246, filed May 24, 1974, now abandoned.

This invention relates to improvements in the construction of armor plate materials and, more particularly, to armored structure made of plastic laminates in a manner to cause delamination of the structure.

BACKGROUND OF THE INVENTION

The use of laminated plastic materials to form armor structure is old as evidenced by the disclosures in a number of U.S. patents, including the following U.S. Pat. Nos. 3,179,553; 3,539,442; 3,573,150; 3,577,836; 3,657,057; and 3,722,355. While these references utilize different types of plastic materials in the structures thereof, they do not teach or suggest the use of plastic laminates of substantially different densities for the purpose of causing delaminations at the interfaces of adjacent laminates. Such delamination is effective in dissipating the kinetic energy of a projectile striking and entering a structure comprised of such laminates.

A number of groups of laminates of different densities have been used in the past but such use has always required that these groups be parts of a larger armor unit having additional layers of foam or other materials bonded to and disposed between adjacent pairs of laminate groups. Thus, such armor unit is extremely bulky and heavy, and is not practical for many applications. Until the present time, it was believed that this construction required the presence of such additional layers; however, it has now been established that a laminate group of the aforesaid type can, by itself, be used as armor structure without the need of layers of foam or any other material on the outer faces thereof. This permits armor structure to be made from only a single group of laminates of different densities and allows the armor structure to be of limited size and weight yet it can be highly efficient by itself in stopping high-speed projectiles without affecting its structural integrity, thereby eliminating the need for additional structure, such as outer layers of foam, ceramic or metal, as has been utilized in the prior art.

Another drawback of the armor structures of the prior art is that they are formed of materials which are easily shattered when a relatively few projectiles are shot into the same. The materials forming the prior structures are not sufficient to avoid such structural damage. Thus, the structures must be frequently replaced if they are to be used as protection over a relatively long period of time.

SUMMARY OF THE INVENTION

The present invention is directed to an improved armor structure formed of plastic laminates with the laminates being comprised of a stack of spaced, reinforced monolithic plates with each pair of plates being separated and interconnected by a layer of plastic material, including a fiber glass mat impregnated with a binder, having a density substantially different from that of the plate.

With the armor structure of this invention, the shock wave of a projectile entering and passing into it is partially propagated through and partially reflected at the interface formed between each plate and an adjacent layer. This phenomenon is due to the variation in density between each plate and each layer very much like the effect which occurs at an air-water interface. By virtue of such propagation and reflection of the shock wave, the plates and adjacent layers delaminate, i.e., they separate from each other at their interfaces and then return to their initial, contiguous positions. This delamination or separation is the means by which the kinetic energy of a projectile is effectively dissipated because portions of such energy are utilized to cause this separation at successive interfaces. In many cases a projectile is completely stopped after it has passed into and through only a relatively few of such interfaces, the projectile stopping at an interface or partially embedded in either a plate or a layer. The penetration distance will, of course, depend upon the size and type of projectiles and the muzzle velocities of the weapons from which the projectiles are fired.

The outer plates of the stack have respective, outer faces which are exposed and which are free of additional structure so that the armor structure is of minimum size and weight yet it can effectively stop multiple projectiles shot into the same, all without substantially effecting its structural strength. Thus, it has a long operating life notwithstanding its plastic construction and its relatively small size and weight.

In forming the assembly, the plates and layers are initially placed in a stack with the binders of the layers in an uncured condition. Then, the pressure is applied to compress the stack and to cure the layer binders, following which the resulting product is ready for immediate use.

The stack can be constructed to have any shape and color; thus, it is suitable for a wide variety of applications. It need not be replaced often because it can be struck with many projectiles without shattering or otherwise being seriously damaged.

The primary object of this invention is to provide improved armor structure formed of laminated plastic materials wherein the armor structure is constructed in a manner to provide for delamination at a number of spaced interfaces between adjacent laminates so that the kinetic energy of a projectile can be more efficiently dissipated than is capable with armor structure of the prior art.

Another object of this invention is to provide improved armor structure comprised of alternating plates and layers of different densities to assure partial propagation and partial reflection of the shock wave of a projectile at the interfaces of the plates and layers to cause a delaminating action therebetween to thereby effect dissipation of the kinetic energy of the projectile before it passes through the armor structure itself.

Another object of this invention is to provide armor structure of the type described wherein the plates and layers form the only elements of the armor structure itself, rendering the latter independent of the need for any additional structural elements on the outer surfaces thereof yet the armor structure is highly efficient in stopping a large number and wide variety of different types of projectiles fired from weapons having a number of different muzzle velocities, all of which can be accomplished without affecting the structural integrity of the armor structure.

Still another object of this invention is to provide an improved armor structure as set forth above wherein each plate of the structure has a plurality of mats of reinforcing material and each layer has at least one mat of fiber glass material with the mats being impregnated with a suitable cured binder and the mat-resin ratios in the plates and layers are such that the plates and layers are of different densities to allow the delaminating action mentioned above to occur when the armor structure is directly struck by and receive a projectile.

Another object of this invention is to provide a method of making armor structure of the aforesaid character in a manner to provide a product which is strong, does not shatter when a projectile enters the same, and allows the lamintes thereof to separate from each other in a delaminating fashion so as to absorb and thereby dissipate the kinetic energy of a projectile entering the same.

Other objects of this invention will become apparent as the following specification progresses, reference being had to the accompanying drawing for an illustration of the invention.

Figure 1:
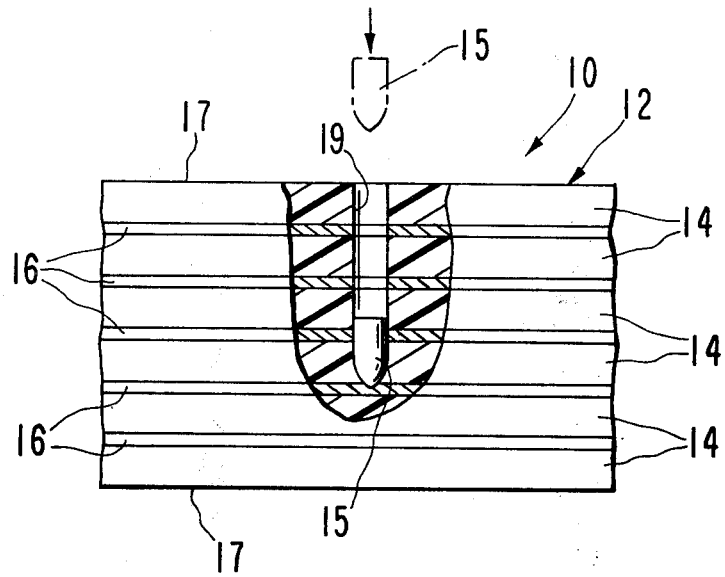
FIG. 1 is a fragmentary, side elevational view, partly in section, of the armor structure of this invention, illustrating the way in which a projectile, such as a rifle bullet, enters and penetrates the structure.

The armor structure of the present invention is broadly denoted by the numeral 10 and includes a stack 12 of plates 14 and coupling layers 16 which are disposed between and interconnect adjacent plates 14 as shown in FIG. 1. The plates and layers define the only elements of armor structure 10, i.e., there are no external materials needed on the outer exposed surfaces 17 of the outer plates 14 in order to carry out the teachings of this invention. While any number of plates 14 can be used in stack 12, there are typically 10 such plates in the stack. A particular application or applications for armor structure 10 will determine the number of plates.

Figure 3:
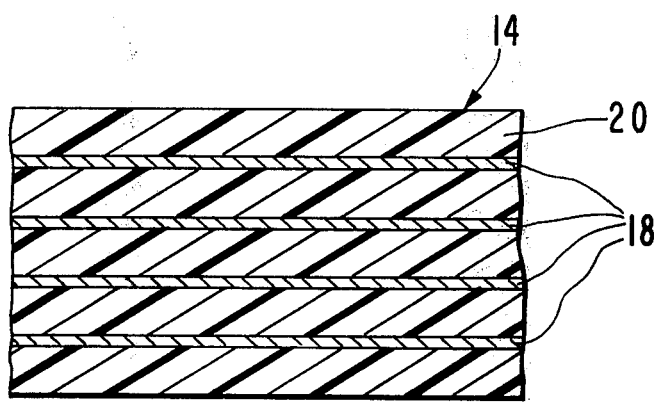
FIG. 3 is a cross-sectional view of one of the plates thereof.

Each plate 14 has the construction shown in FIG. 3. It includes a number of reinforcing mats 18 of a suitable fibrous material. Preferably, each mat is formed of chopped fiber glass material although the mat can be of nylon. A typical mat has a weight of 1½ oz. per square foot and is commercially available from Plastic Distributors, Inc., of San Leandro, Calif.

Mats 18 are embedded in a matrix denoted by the numeral 20 of a suitable binder material, such as a polyester resin. A suitable catalyst is added to the binder, and the weight ratio of binder to the catalyst and the mat is selected to provide the resulting plate with a given specific gravity, such as 1.0. Typically, this ratio is 60% resin and 40% fiber glass mat and catalyst.

In manufacturing each plate 14, the mats are stacked upon each other and the resin mixed with the catalyst is directed into the mats, whereupon the resin and mats are subjected to surface pressure in the range of 1350 to 3000 psi. At this pressure range, the overall assembly of resin, catalyst and fiber glass mats is compressed to a typical thickness of about ⅛-inch.

While any one of a number of different binders is suitable for use in forming each plate 14, it is preferably of a polyester resin. A suitable resin is denoted by the product code 32032 made by Reichhold Chemical Company, South San Francisco, Calif. A suitable catalyst for this purpose is one made by Reichhold Chemical Company and having the product code 46700. Another suitable binder for each plate 14 is a polyester resin of the type denoted by product code 32050, made by Reichhold Chemical Company. This has a lower viscosity than the resin identified as product code 32032; thus, it provides a harder consistency for the plate.

Four fiber glass mats 18 are preferably used in each plate 14, respectively. This particular number of mats provides strength for the plates yet the plate is not too brittle. The mats effectively reinforce the plates to prevent the resin material from shattering when the plate is penetrated by a projectile. Moreover, the resin-mat combination of plates 14 and layers 16 provides a monolithic construction which causes a projectile 15 (FIG. 1) when passing therethrough to leave a substantially clean hole 19 rather than a jagged, enlarged opening. This feature assures that the plate can be hit many times with projectiles without destroying its structural integrity, so that armor structure 10 will have a long operating life.

Figure 2:
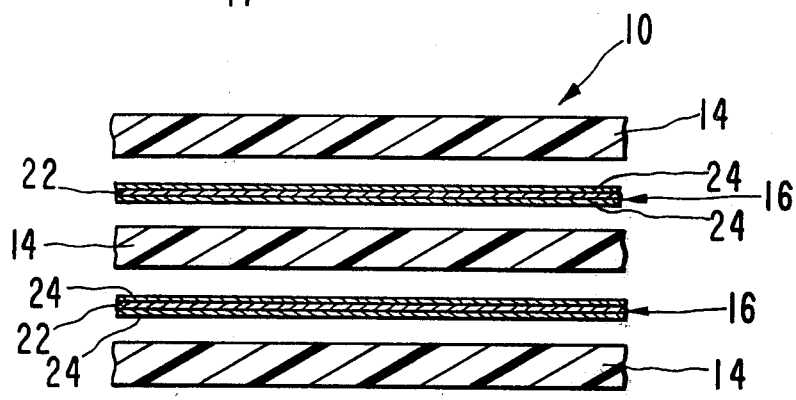
FIG. 2 is an exploded, cross-sectional view of the armor structure.

Each layer 16 is comprised of a mat 22 impregnated with a binder, such as a polyester resin, the binder being shown in FIG. 2 on opposite sides of mat 22 so that layer 16 has a finite thickness. A typically thickness of the layer is any value in the range of 1/64-inch to 1/16-inch.

Each layer 16 has a specific gravity substantially different from that of the adjacent plates 14. Preferably, the specific gravity of each layer 16 will be greater than 1.0 and is in the range of 1.5 to 2.5. The resin-mat ratio can be selected to provide for a specific gravity in this range.

In forming stack 12, layers 16 are placed on respective plates therebelow by first placing a chopped fiber glass mat on the lower plates and applying uncured binder 24 to the mats with the quantity of the binder being sufficient to assure that each layer will have the desired specific gravity. As soon as the lay-up of the plates 14, mats 22 and binder 24 is completed, the assembly is subjected to mechanical pressure, such as in a press. This causes curing of binder 24 and results in the formation of armor structure 10. A typical curing time is 1 hour, and as soon as the curing period has elapsed, armor structure 10 is ready for immediate use. A typical mechanical pressure is 750–950 psi.

When a projectile, such as projectile 15, strikes one of the outer surfaces 17, the projectile will continue on into stack 12 and will pass through one or more plates 14 and layers 16. In many cases, the projectile will be stopped after passing through only a single plate and a single layer. As the projectile enters the stack, its shock wave will propagate in advance of the projectile and, as such shock wave crosses an interface between each plate 14 and an adjacent layer 16, a portion of the shock wave will continue through the interface and a portion will be reflected thereby. This causes delamination of the plate and layer in the sense that they will physically separate from each other at a region surrounding the area through which the projectile passes. Such delamination partially absorbs and thereby partially dissipates some of the energy of the shock wave so that if the shock wave continues on, it will be successfully dissipated by the downstream plates and layers. Finally, the projectile will come to a stop internally of stack 12 and remained lodged therewithin.

After a plate and layer have become delaminated, i.e., separated or bowed outwardly from each other, they return to their equilibrium conditions and remain bonded to each other because of the absence of air therebetween. Thus, the delamination effect does not interfere in any way with the interconnection between the plates and layers. Moreover, the reinforcement of the plates and layers by the mats thereof assures that a projectile will only cause relatively clean holes to be formed therein as the projectile passes therethrough.

Armor structure 10 is suitable for a wide variety of uses including all of the following: judges' benches, courthouse security doors, the roofs, trunks, seat-backs, fire wall, radiator shields and engine shields of police vehicles, riot helmets, hand-held transparent movable shields, speakers podiums and the like. Armor structure 10 is also especially adapted for military uses such as flak shields, aircraft wings and bodies, sidewalls for vehicles and boats and aircraft cable covers or tubes.

To illustrate the effectiveness of armor structure 10, a number of tests were conducted with the structure which was placed in a concealed, loose position inside of the door of an automobile. Armor structure 10 had 10 plates 14 so that the overall thickness of structure 10 was approximately 1⅛-inches. The following table shows the type of weapon used to fire projectiles into the door, the distance of the weapon from the door, and the muzzle velocity and muzzle energy of a projectile leaving the weapon. In all cases, the projectiles were stopped and became lodged in the armor structure so that none of the projectiles completely passed therethrough.

material embedded in a cured thermosetting resin to form a monolithic unit each plate having a thickness of at least ⅛ inch and a specific gravity of about 1.0, said connecting means comprising a bonding layer including a mat of fibrous material impregnated with a rigid binder material and having a specific gravity of at least 1.5, there being a bonding layer between each pair of adjacent plates, respectively, so as to present an interface between each plate and the adjacent bonding layer at which delamination can occur, each bonding layer having a thickness in the range of 1/64-inch to 1/16-inch, the outer plates of said stack having exposed outer surfaces through which a projectile must pass before striking the stack so that either outer plate is subject to being directly stuck by a projectile, each bonding layer being bonded to substantially the entire adjacent surface portion of the adjacent plate.

2. An armor structure as set forth in claim 1, wherein each mat is comprised of a sheet of fiber glass material having a weight of approximately 1.5 oz. per square foot.

3. An armor structure as set forth in claim 1, wherein each plate has four fiber glass mats embedded therein, the resin of each plate being thermosetting and presenting a pair of opposed, generally smooth outer surfaces therefor.

4. An armor structure as set forth in claim 1, wherein

| NO. | WEAPON MAKE AND BARREL LENGTH | CALIBER | DISTANCE FROM TARGET | MUZZLE VELOCITY FEET PER SECOND | MUZZLE ENERGY FOOT POUNDS |
|---|---|---|---|---|---|
| 1 | BERETTA 2" 1935 AUTO | 32 AUTO 71GR., FULL METAL CASE | 3-5 FEET | 905 | 130 |
| 2 | SMITH & WESSON 4" MODEL 19 | .357 MAGNUM 158GR. LURALOY | 3-5 FEET | 1410 | 695 |
| 3 | SMITH & WESSON 4" MODEL 19 | .357 A.P. 158GR. JACKETED | 3-5 FEET | 1410 | 695 |
| 4 | SMITH & WESSON 4" MODEL 19 | 38 SPECIAL 158 GR. SWC | 3-5 FEET | 1060 | 395 |
| 5 | SMITH & WESSON 4" MODEL 19 | .357 SUPER VEL 158 GR. HP | 3-5 FEET | 1410 | 605 |
| 6 | RUGER BLACKHAWK 7" | U.S. 30 CARBINE 196 GR. MIL BALL | 3-5 FEET | 1900 | * |
| 7 | RUGER BLACKHAWK 7" | U.S. 30 CARBINE 110 SP SPORT | 3-5 FEET | 1500+ | * |
| 8 | RUGER BLACKHAWK 7" MODEL SUPER | 44 S&W SPECIAL 246 GR. LEAD | 3-5 FEET | 755 | 310 |
| 9 | RUGER BLACKHAWK 7" MODEL SUPER | 44 MAGNUM (REM) 240 GR. H.P. | 3-5 FEET | 1470 | 1275 |
| 10 | RUGER BLACKHAWK 7" MODEL SUPER | 44 MAGNUM (REM) 240 GR. S.P. | 3-5 FEET | 1470 | 1275 |
| 11 | REMINGTON, RIOT 18" SHOTGUN | 12 GAUGE 00 BUCKSHOT | 10 FEET | * | * |
| 12 | REMINGTON, RIOT 18" SHOTGUN | 12 GAUGE SLUG 1 OUNCE, RIFLED | 10 FEET | 1500 | 2200 |
| 13 | BROWNING, AUTO 4" | 9MM LUGER 124 GR. FULL MJ | 3-5 FEET | 1120 | 345 |
| 14 | COLT AR-15 STD. RIFLE | 5.56MM (.223 CAL) 56 GR. MIL. BALL | 10 FEET | 3250 | 1330 |
| 15 | COLT, AUTO 5" GOV'T MODEL ** | 45 CAL. ACP 230 GR MIL. BALL | 3-5 FEET | 860 | 425 |

The foregoing results establish clearly that the armor structure of this invention is highly efficient and can stop projectiles of many different types fired many kinds of weapons. Other tests results from the firing of projectiles directly onto armor structure 10, i.e., without first passing through structure, such as an automobile door, confirm the foregoing test results in that the projectiles were all contained within the armor structure and none completely passed therethrough.

I claim:

1. Armor structure defining a cured unitary body comprising: a plurality of monolithic plates and means connecting the plates together in a stack with each pair of plates being spaced apart, each plate being comprised of a number of generally spaced mats of glass fibrous each plate is comprised of 60% resin and 40% mat and catalyst.

5. Armor structure defining a cured unitary body comprising: plurality of monolithic plates and means connecting the plates together in a stack with each pair of plates being spaced apart, each plate being comprised of a number of generally spaced mats of chopped fiber glass material embedded in a cured thermosetting resin to form a monolithic unit each plate having a specific gravity of about 1.0, said connecting means comprising a bonding layer including a mat of chopped fiber glass material impregnated with a rigid binder material and having a specific gravity of at least 1.5, there being a bonding layer between each pair of adjacent plates, respectively, so as to present an interface between each plate and the adjacent bonding layer at which delamination can occur, the outer plates of said stack having exposed outer surfaces through which a projectile must pass before striking the stack so that either outer plate is subject to being directly struck by a projectile, each bonding layer having a thickness less than that of each plate.

* * * * *